(12) United States Patent
Stanish (10) Patent No.: US 7,004,481 B1
(45) Date of Patent: Feb. 28, 2006

(54) WHEELED UTILITY BAG

(76) Inventor: Anthony Stanish, 5745 Ripley Park Dr., La Plata, MD (US) 20616

( * ) Notice: Subject to any disclaimer, the term of this patent is extended or adjusted under 35 U.S.C. 154(b) by 140 days.

(21) Appl. No.: 10/386,129

(22) Filed: Mar. 12, 2003

Related U.S. Application Data (60) Provisional application No. 60/363,242, filed on Mar. 12, 2002.

(51) Int. Cl.
*B62B 1/12* (2006.01)
*A45C 5/14* (2006.01)

(52) U.S. Cl. .................. 280/37; 280/47.26; 310/128; 190/18 A; 190/108

(58) Field of Classification Search .............. 280/37, 280/652, 655, 655.1, 43.15, 43.16, 47.18, 280/47.24, 47.26, 47.315, 63, 293; 301/128; 190/107, 108, 109, 110, 115, 18 A
See application file for complete search history.

(56) References Cited

U.S. PATENT DOCUMENTS

| | | | | |
|---|---|---|---|---|
| 2,513,020 A | * | 6/1950 | Haney .................. | 280/47.19 |
| 2,556,814 A | * | 6/1951 | Love ..................... | 280/659 |
| 2,973,209 A | * | 2/1961 | Shaw .................... | 280/755 |
| 3,953,045 A | * | 4/1976 | Feret, Jr. ................ | 280/638 |
| 4,576,389 A | * | 3/1986 | Villaveces et al. ....... | 280/43.16 |
| 4,801,213 A | * | 1/1989 | Frey et al. .............. | 383/3 |
| 5,730,264 A | * | 3/1998 | Lu ........................ | 190/108 |
| 5,743,447 A | * | 4/1998 | McDermott ............. | 224/153 |
| 5,879,022 A | * | 3/1999 | Winton .................. | 280/655 |
| 6,213,266 B1 | * | 4/2001 | Hollingsworth ......... | 190/108 |
| 6,227,339 B1 | * | 5/2001 | Bogert ................... | 190/18 R |
| 6,231,059 B1 | * | 5/2001 | Cheldin ................. | 280/47.24 |
| 6,550,592 B1 | * | 4/2003 | Godshaw et al. ........ | 190/18 A |
| 6,561,527 B1 | * | 5/2003 | Spadino ................. | 280/47.26 |
| 6,604,617 B1 | * | 8/2003 | Davis et al. ............ | 190/107 |
| 2003/0141684 A1 | * | 7/2003 | Edwards ................ | 280/37 |
| 2004/0119262 A1 | * | 6/2004 | Stout .................... | 280/415.1 |
| 2004/0144606 A1 | * | 7/2004 | Han ..................... | 190/18 A |

* cited by examiner

*Primary Examiner*—Jeff Restifo
(74) *Attorney, Agent, or Firm*—Jones Tullar & Cooper, PC (57) ABSTRACT

A wheeled utility bag that includes a customizable storage area for conveniently transporting a number of items and extendable axles for increased stability. The utility bag includes a rigid base incorporating an extendable handle, a fixed handle, extendable axles supporting at least one rotatable wheel and a container such as a flexible bag. A supply kit can be removably mounted to a first side of the rigid base while the flexible bag is permanently attached to a second side of the base. The flexible bag forms a main compartment area for transporting tools or implements. A customized insert can be included in the main compartment. The utility bag also including a number of secondary compartments, retainers, handles, attachments and pockets.

22 Claims, 6 Drawing Sheets

WHEELED UTILITY BAG

This application claims the benefit of U.S. Provisional Application No. 60/363,242, filed Mar. 12, 2002, the disclosure of which is hereby incorporated herein by reference.

FIELD OF THE INVENTION

The present invention relates, in general, to a customizable wheeled utility bag usable by mechanics, repairman, hobbyists, and the like. More particularly, the present invention is directed to a wheeled utility bag which integrates an extendable handle and an extendable wheel axle. More specifically, the present invention is directed to a wheeled utility bag having various attachments and customizable configurations, all of which provide an innovative apparatus that finds use for transporting a wide-range of implements.

BACKGROUND OF THE INVENTION

A utility bag having the ability to safely and conveniently convey the bag owner's belongings, tools, or implements is a desired goal for luggage, tool kit, and utility bag manufactures. For a mechanic or field worker, everyday job tasks can be physically demanding, without the proper tools. Yet, current tool kits are bulky and heavy, making them difficult to carry. Wheeled tool kits are prone to tipping over and often impair a worker's ability to transport the kit. A poorly designed tool kit can lower productivity in a number of ways. For example, a worker may have to make multiple trips to obtain the necessary tools or may decide to leave certain items behind. In addition, heavy and poorly designed tool kits can lead to injuries associated with transporting the kit or attempting to complete a job without the proper equipment. A safety risk also exists if the worker decides to leave behind safety items.

Obviously, an improved utility bag would benefit a wide range of users in addition to mechanics or other skilled workers. Hobbyists, for instance, often utilize numerous, specialized implements for their activities. Without a practical means to convey their implements, the hobbyist's enjoyment and time spent actually involved with the activity decreases. Of course, vacation and business travelers also value luggage that is more stable and comfortable to transport.

Presently available utility bags often do not fully satisfy specific work and recreational requirements. Mechanics, electricians, hobbyists and the like need a utility bag that allows them to conveniently and safely transport the specific implements usable in their area endeavor. In addition, there exists a need for a utility bag that can serve as a platform for attachments that would assist a person with their specific activity. Therefore, the present invention satisfies the need for a customizable utility bag that is suitable for a number of uses and that can conveniently and easily transport the various tools, implements and belongings a user may need.

SUMMARY OF THE INVENTION

In accordance with the present invention, a wheeled utility carrier is provided which allows a user to safely and conveniently transport a large variety of tools or implements. The wheeled utility carrier of the present invention preferably includes a rigid base incorporating a handle or handles and two extendable axles with dual wheels on each axle. A small container such as a supply kit can be removably mounted to a first side of the base while a relatively large container, such as a flexible tool bag, is permanently attached to a second side of the rigid base. The flexible bag may include a main compartment area for transporting tools or implements, and may incorporate a customized insert for organizing the tools. The wheeled utility carrier may also include a number of secondary compartments, retainers, handles, attachments and pockets, as desired for the particular use of the device.

The wheeled utility carrier, or bag, is intended to serve as a portable and versatile companion for a worker, hobbyist, traveler or the like, with the insert for the main compartment in the container being with the insert for the main compartment in the container being configured for the specific activity of the user. For example, a repairman's insert would include a number of retainers for tools, while also including an open area to place bulky items that might be needed at a remote work site. A medical technician's insert could include dividers or receptacles within the main compartment that would be usable to separate items in a sanitary manner. A hobbyist's insert would be structured to accept implements specific to a given hobby. Basically, the inserts can be custom built for any application, and can be interchanged so the utility bag is customizable and multi-functional. The container has a lid to seal the main compartment, with a zipper or other equivalent closure device securing the lid to retain the insert and a user's tools or other items within the main compartment.

The exterior of the container preferably includes at least one handle, as well as additional pockets and retainers for loose items. The utility bag has supports allowing it to rest in either a horizontal position, where the rigid base is substantially parallel to the wheeled utility bag's support surface, or in a vertical position where the rigid base is substantially perpendicular to the wheeled utility bag's support surface. A handle is anchored to the flexible bag for a user to carry the bag horizontally.

The rigid base of the wheeled utility bag preferably includes a pair of handles. A first extendable handle allows a user to tow the utility bag, and a second, fixed handle is provided so that the user can carry or lift the utility bag while it is in its vertical position.

For convenience, and because the weight of the utility bag may exceed the lifting ability of the user in some applications, the two axially aligned, extendable axles, each supporting a pair of wheels, allow the bag to be towed or pushed. The wheels supported on each axle are located at the axles' outer, or distal ends, remote from the body of the wheeled utility bag. The inner, or proximal end of each axle is inserted into an axle receptacle formed in the rigid base, or secured to it. In one form of the invention, the axles are secured in an axle cylinder that is mounted to the rigid base of the utility bag, with the axles each being adjustably securable in the cylinder in at least two positions, allowing a user of the bag to set the two axles in either a first, wider or expanded stance or a second, narrower normal stance. The wider stance helps stabilize the utility bag and prevents tip overs that could damage expensive equipment. The narrower stance is suitable for stable and/or relatively light loads, maneuvering through narrow doorways, and storing the utility bag. A spring is located between each pair of wheels on each axle to expand and space the wheels apart when each axle is in its extended position and to collapse and allow the wheels in each pair to be adjacent each other when the axles are in the normal retracted position. An outboard wheel of each wheel pair is rotatably mounted at the distal end of each axle, while an inboard wheel of each wheel pair is rotatably mounted on, and slides along, the axle and is adjacent to the rigid base of the utility bag. When the axle is in its normal position, and is fully inserted into the axle cylinder, the spring is compressed and the wheels are situated adjacent to one another. When the axle is extended, the outboard wheel is moved away from the rigid base, but the spring retains the inboard wheel in position adjacent to the base.

The rigid base can also include a removable supply kit that can include additional tools or items the user may need. For example, the supply kit might include a ratchet set or first aid kit. The supply kit is mounted on the side of the rigid base opposite the flexible bag, it rests on brackets, and is secured by a spring actuated knob.

The utility bag could also be provided with a number of clamps and attachments which will convert the utility bag into a work 'companion' or workbench.

The wheeled utility bag in accordance with the present invention overcomes the limitation of the prior devices, and is a substantial advance in the art.

BRIEF DESCRIPTION OF THE DRAWINGS

The foregoing and additional objects, features and attendant advantages of the present invention will be more fully appreciated and understood when considered in conjunction with the accompanying drawings, in which like reference characters designate the same or similar parts throughout the several views, and wherein.

DETAILED DESCRIPTION

While the invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

Generally, the utility bag of the present invention incorporates new and customized components that improve upon the comfort, safety, and efficacy of presently known utility bags or tool kits and that can be tailored for a specific job, industry, hobby, or other activity. The bag includes wheels located on extendable axles that provide stability. The bag also doubles as a work stand and incorporates a number of attachments and devices useful to a user.

Figure 1:
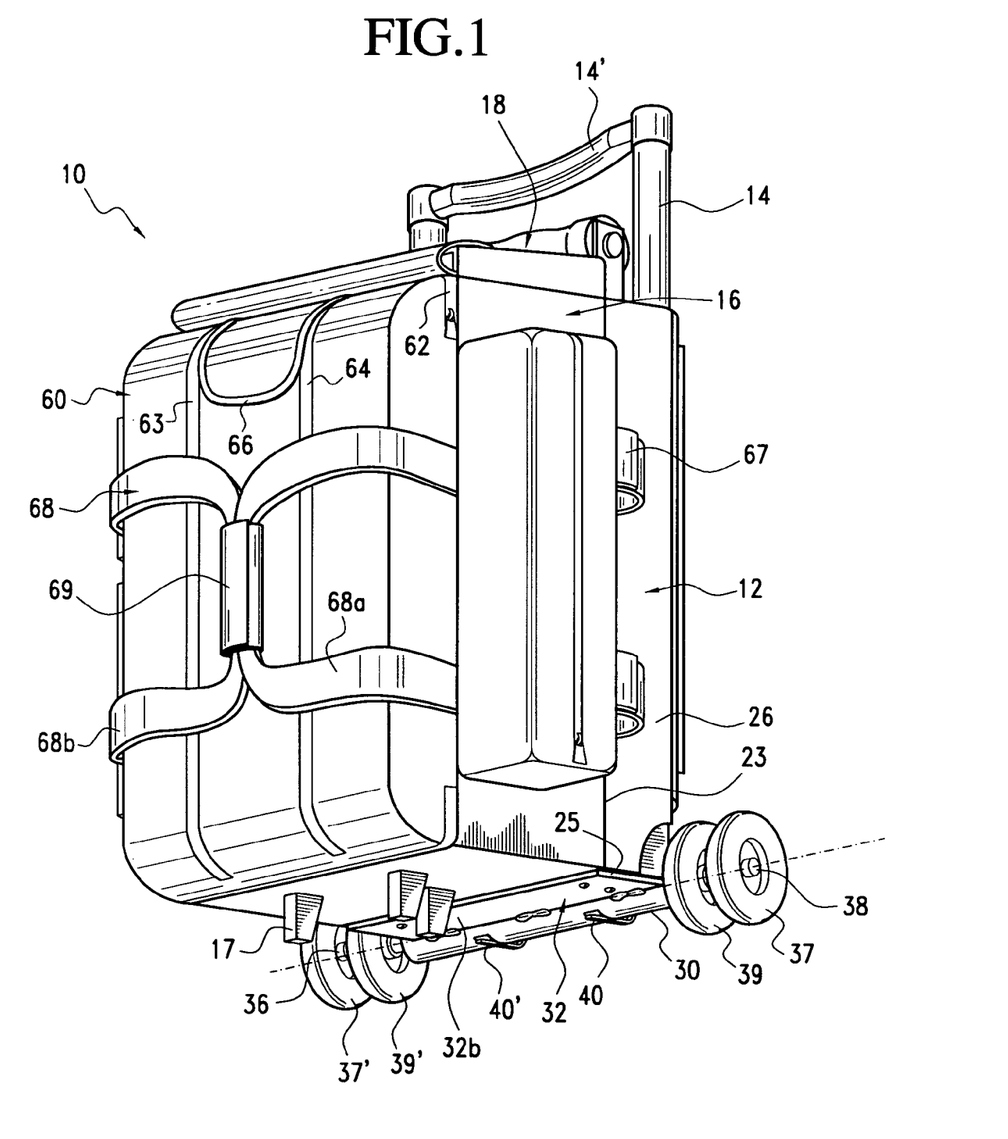
FIG. 1 is a front perspective view of a utility bag in accordance with the present invention and showing an extendable handle at least partially retracted and an extendable axle partially retracted.
Figure 2:
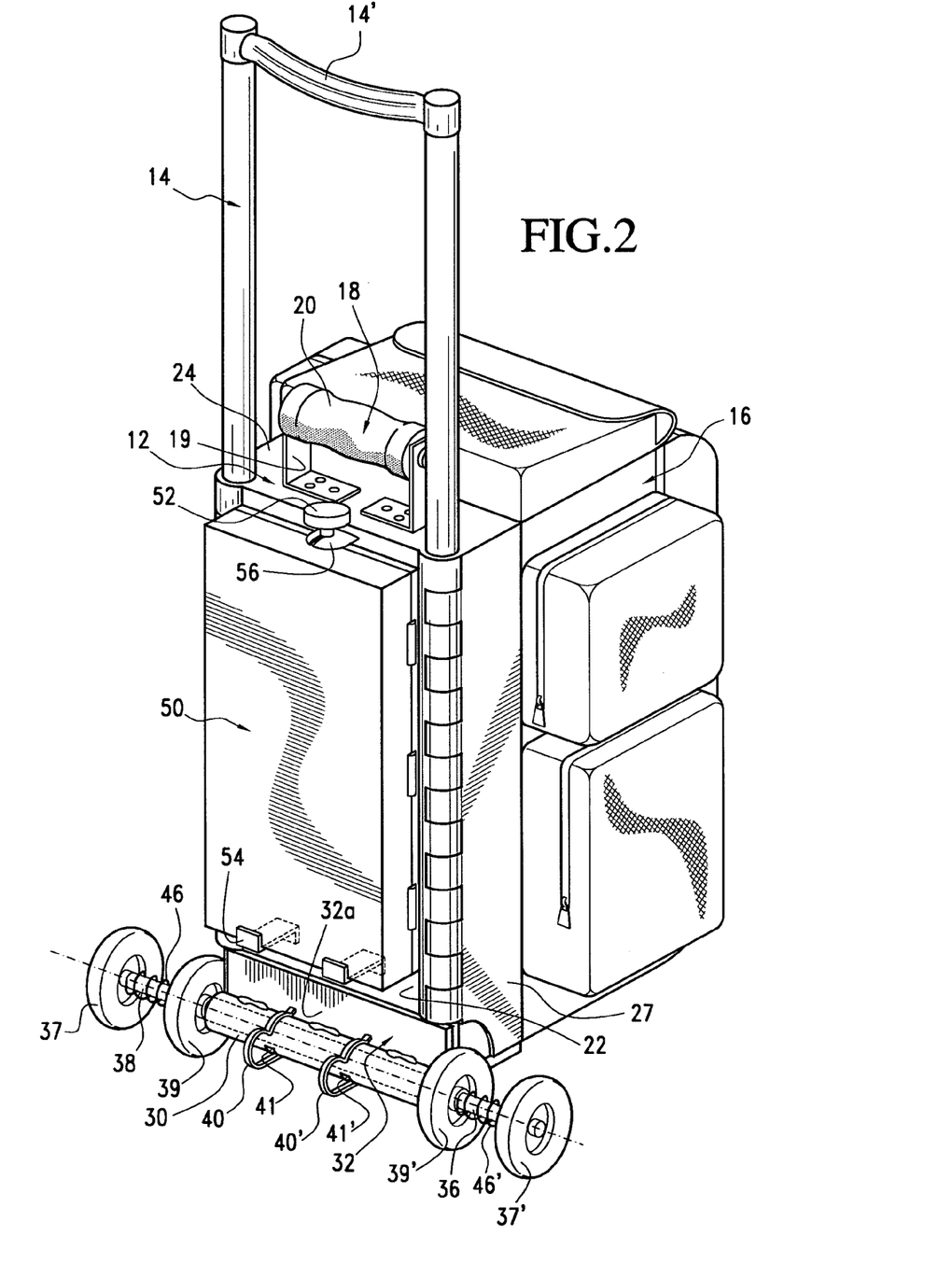
FIG. 2 is a rear perspective view of the utility bag of the present invention and showing both the extendable handle the extendable axle as extended.

Referring initially to FIG. 1, there is illustrated a first preferred embodiment of a wheeled utility carrier, or bag, generally indicated at 10, in accordance with the present invention. Utility bag 10 includes a rigid base 12', an extendable handle 14, a main container 16 which may be a flexible bag, a fixed handle 18 on the base, and two extendable axles 36, 38 mounted on the base. Rigid base 12 provides a frame or support for utility bag 10. This rigid base 12 is preferably fabricated from a light weight, yet strong, material such as plastic and has a generally rectilinear shape adapted to receive the main container 16. This base may be in the form of a tray with upwardly extending edge walls, or lips, to surround the base of the container, or may be in the form of a closed, rigid box having front, rear and side panels, with the container being secured to the front panel. The latter configuration is illustrated in the drawings for convenience, but it will be understood that the rigid base may be configured in a variety of shapes to receive and secure the container, the carry straps, the extendable handle, and the supporting axles and wheels. As illustrated in FIGS. 1 and 2, the base includes a back wall panel 22 located at the rear of utility bag 10, and a front wall panel 23, which is concealed by flexible bag 16, and which attaches to and substantially covers it. Top wall 24, bottom wall 25, right side wall 26, and left side wall 27 complete the rigid base 12.

Also as illustrated in FIGS. 1 and 2, rigid base 12 supports the extendable and fixed handles 14 and 18. Extendable handle 14 has a crossbar 14' and spaced elongated legs of fixed length, which are inserted into apertures in top wall 24 and extend into the base 12, preferably in guide tubes (not shown) within the base. A plurality of conventional lock-stop positions permit a user to adjust the length of the handle relative to the bag. Preferably, extendable handle 14 is long enough to allow a user to tow utility bag 10 with a long walking stride while eliminating the possibility of heel-to-bag contact. However, any number of lock-stop positions are possible, from fully inserted to fully extended as selected by the user based on the weight of the load or the height of the user. The handle may be secured in the selected position by suitable pins (not shown) on other conventional fasteners.

As illustrated in FIG. 2, the crossbar 14' of the extendable handle 14 preferably will not be flush with top wall 24 when extendable handle 14 is fully inserted into rigid base 12, due to the fact that it is advantageous to provide an extendable handle that is longer than the height of rigid base 12. The extra length provides users room to fully stride when towing the bag. The handle 14 could easily be stored flush with the top wall 24 by reducing the length of the handle. An alternative for providing a flush fitting includes a telescoping handle that is collapsible within itself. Such a telescoping, variable length handle may replace the fixed length extendable handle included in the illustrations. However, collapsible telescoping handles are less rigid and may be less suitable for heavier loads.

The second fixed handle 18 which allows a user to carry or lift utility bag 10 vertically. A set of handle brackets 19 are fastened to top wall 24 and support a grip 20. Fixed handle 18 affords the user a secure grip by encasing grip 20 in a thick, soft foam rubber. However, any number of grip and handle constructions outside of the illustrated embodiment could be used. For example, a flexible handle could be anchored to top wall 24 which would allow a user to lift utility bag 10 vertically.

An axle receptacle is secured to or is integral with rigid base 12 to receive and support axles 36 and 37. Although a number of construction techniques and materials are available, in a preferred form of the invention, illustrated in cross-section in FIG. 7, an axle cylinder 30 forms the axle receptacle and is secured to, or is integral with, a mounting bracket 32. Mounting bracket 32, in turn, is shaped to conform to rigid base 12 at the intersection of back panel 22 and bottom wall 25. Mounting bracket 32 is generally 'L'-shaped in cross-section at roughly a 90 degree angle, and includes a first leg 32a secured to panel 22 and a second leg 32b secured to bottom wall 25. A plurality of fasteners 34 extend through one or more of the legs of mounting bracket 32 to secure it to rigid base 12. If both mounting bracket 32 and axle cylinder 30 are metal, the cylinder is preferably welded to the bracket, although it is apparent that the cylinder could be otherwise fastened to the bracket. If desired, axle cylinder 30 and mounting bracket 32 could be integrally formed from a single piece of plastic, or cylinder 30 and bracket 32 could consist of multiple pieces of plastic that snap together and are anchored to the base. Plastic, metal, and other rigid materials are suitable for constructing the cylinder and bracket.

Two axially opposed, extendable axles 36, 38 are retained in axle cylinder 30. To make the utility bag 10 easily transportable, the extendable axles each support a pair of wheels that provide for the ability to tow or push utility bag 10. Thus, the axles 36 and 38 each carry a corresponding outboard wheel 37, 37' that mounted, preferably by suitable bearings, on the distal end of the respective axles. The axles also carry corresponding inboard wheels 39, 39' that are mounted on bearings and are slidable along the respective axles in the axial direction. The inner, or proximal ends of the axles are inserted into axle cylinder 30 and are adjustably secured by suitable fasteners to enable the axles to be located in multiple positions. When in an extended position, axles 36, 38 provide a wider stance that helps to stabilize utility bag 10 and prevents tip overs that could damage expensive equipment. When in a normal, or retracted position, the axles provide a narrower stance that is more suitable for stable and/or relatively light loads, maneuvering through narrow doorways, and storing the utility bag. Intermediate positions may also be provided, as desired.

Figure 3:
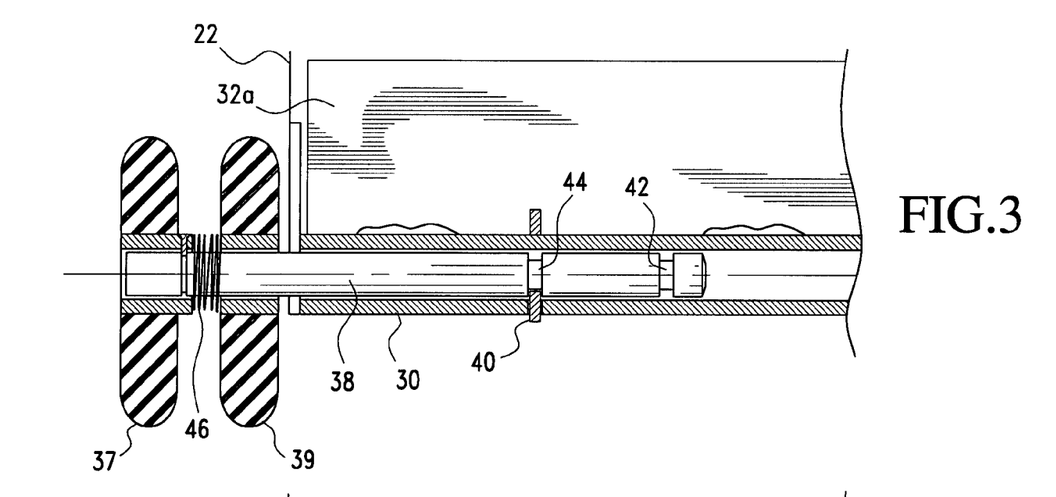
FIG. 3 is a cross-section of an axle cylinder and an extendable axle for the utility bag of the present invention in which the retracted axle is depicted in its retracted position with the axle cylinder in accordance with one embodiment.
Figure 4:
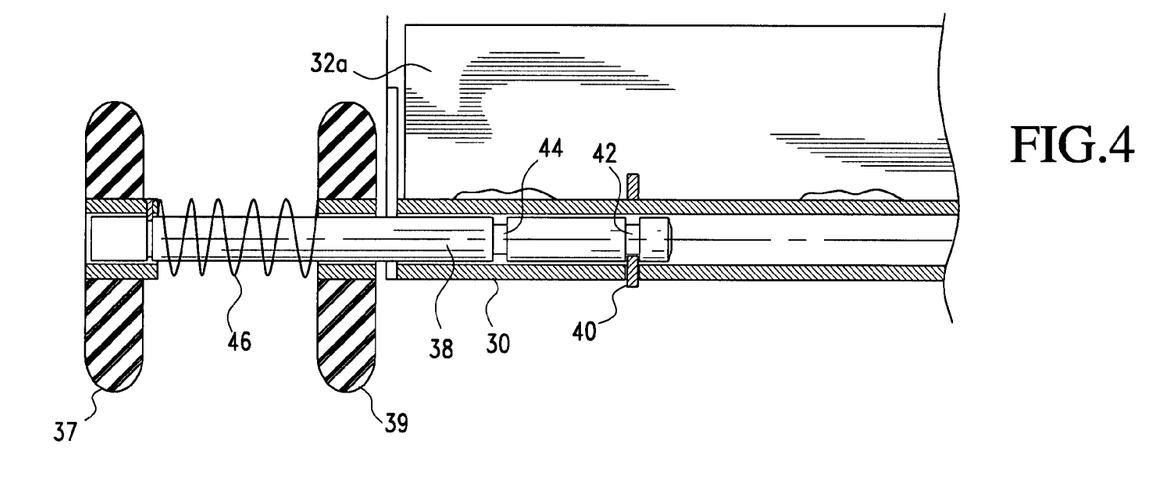
FIG. 4 is a cross-section view of the axle cylinder and extendable axle wherein the axle is extended shown in its extended position.

FIGS. 3 and 4 are cut-away views showing axle 38 in axle cylinder 30 in greater detail. Although axle 36 is not afforded the same illustration, axle 36 and axle 38 have identical structures and are essentially mirror images of each other. Therefore, the following description of FIGS. 3 and 4 should be read as applying to both axles 36 and 38.

The proximal end of axle 38 includes at least two spaced-apart circumferential grooves forming a first, or extended position, channel 42, and a second, or retracted position, channel 44. Channel 42 is located adjacent the proximal end of axle 38 and channel 44 is positioned more towards the longitudinal center of the axle, the distance between them being selected to establish the distance which the outboard wheels will extend from the rigid base when in the extended position. Each of channels 42, 44 decreases the circumference of the axle at the location of the channels and serves to receive a suitable fastener which engages either channel 42 or channel 44 to secure axle 38 in the axle receptacle. The fastener preferably is a spring-loaded locking mechanism such as a detent or pin secured in the receptacle, which allows the axle to be extended or retracted by removal of the locking mechanism or by pulling or pushing the axle in an axial direction with sufficient force to overcome the spring loading of the lock.

In the illustrated embodiment, the fastener is a spring lock pin 40 insertable through an aperture 41 in axle cylinder 30. The lock pin 40 is an elongated member that has a straight portion at least as long as the width of axle cylinder 30, and a second portion that arcs 180 degrees backwards to form a 'C'-shaped spring bend. The 'C'-shaped bend is sized to clamp to the exterior of axle cylinder 30. The straight portion of lock pin 40 is inserted into aperture 41 of axle cylinder 30 when one of the axle channels 42 or 44 is lined up with the aperture. Once inserted, lock pin 40 is held in place by the spring action of the bent portion, preventing axle 38 from sliding laterally within axle cylinder 30. Axle 38 is in the retracted position when the spring lock pin 40 engages channel 44, and is in its extended position when lock pin 40 engages channel 42.

As illustrated in FIG. 4, a coil spring 46 is located on the axle 38 between wheels 37 and 39 and tends to force the axially slidable inboard wheel 39 towards utility bag 10 with respect to outboard wheel 37. The wheel 37 is rotatable on, and is secured at, the distal end of axle 38. When the axle is extended the spring-presses the wheels apart. As illustrated in FIG. 3, when the axle is retracted, the pin 40 engages retracted channel 44, spring 46 is compressed, and outboard wheel 37 and inboard wheel 39 are adjacent. Both inboard wheel 39 and outboard wheel 37 are mounted on, and rotate about, axle 38 by means of standard bearings.

Figure 7:
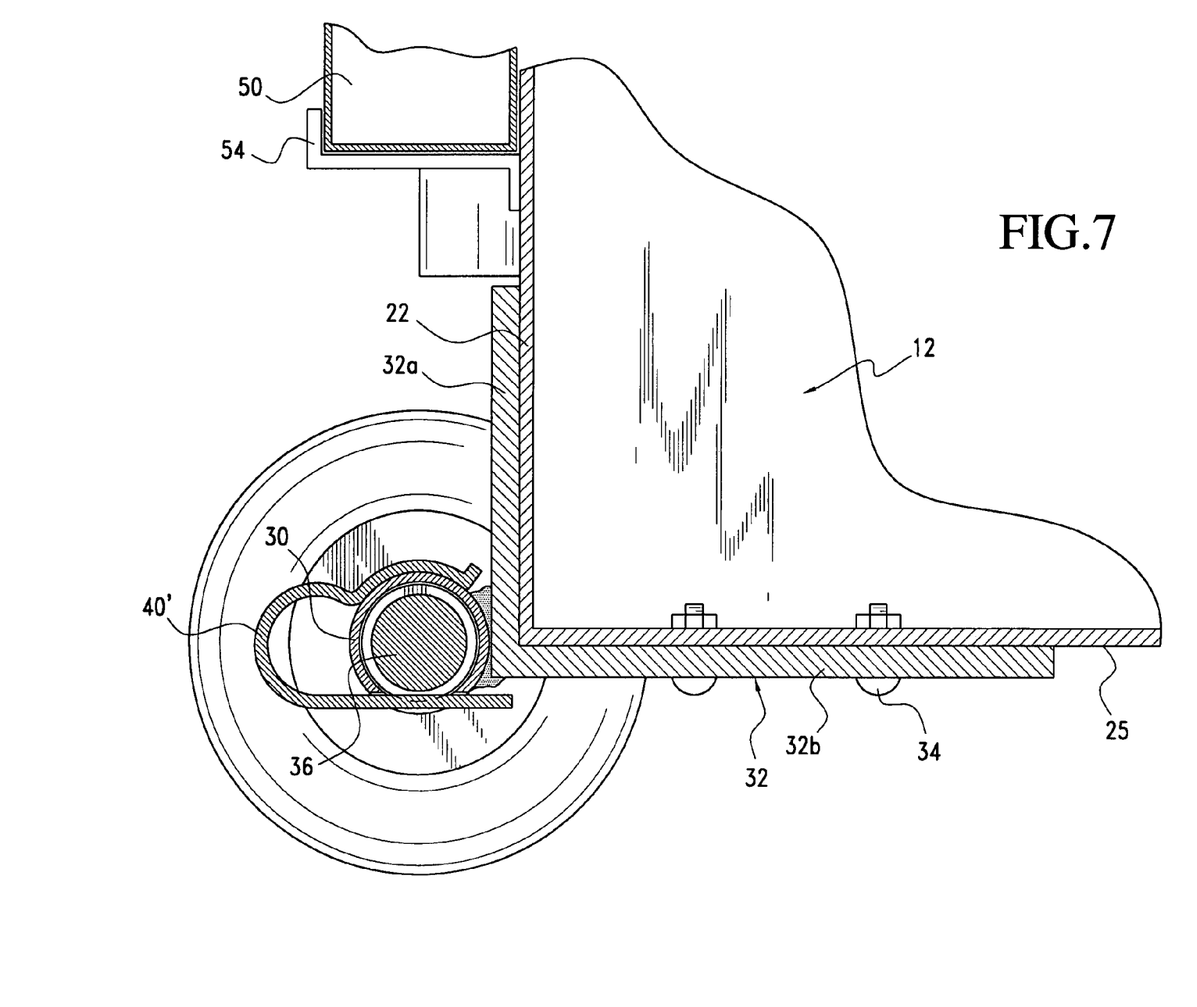
FIG. 7 is a side elevation view, partially in cross-section, of the axle cylinder and one extendable axle of the wheeled utility bag of the present invention.

In use, a user retracts axle 38 by removing lock pin 40 from axle cylinder 30, thereby allowing the axle to slide within axle cylinder 30. The user pushes against outboard wheel 37 in the direction of the axle, compressing spring 46, until retracted channel 44 is aligned with aperture 41 in axle cylinder 30. Pin 40 is then reinserted, as illustrated in FIG. 3, to secure the axle in the retracted position. The bent, 'C'-shaped portion of lock pin 40 helps to retain the pin on the axle cylinder. The axle is extended by removing pin 40, extending the axle, and inserting the pin in channel 42. FIG. 7 further illustrates this preferred embodiment of the axle and pin assembly by way of a side-view. Although the pin 40 in the illustrated embodiment is removed from the axle cylinder to permit extension and retraction of the axle 38, such movement of the axle can be accomplished without removal of the pin if the portion of the pin which engages channels is slightly flexible, and the channels are shallow. In this case, an axial force is sufficient to release the pin from the channel, allowing the axle to slide inwardly or outwardly, where the pin will engage the next channel to position the axle. This extendable structure of the axle and axle cylinder assembly greatly improves the mobility and stability of utility bag 10.

It will be understood that alternative constructions are available. Most notably, mounting bracket 32 and axle cylinder 30 could be replaced by an axle receptacle which includes a pre-molded channel extending across back panel 22 of rigid base 12 from left side wall 27 to right side wall 26. In this embodiment, axles 36, 38 would fit securely into the pre-molded channel and suitable fasteners, such as lock pins 40, 40', would be inserted into channels or apertures in the axles. Apertures in rigid base 12 would secure the fasteners to prevent the axles from moving axially along the axle receptacle. Alternatively, spring-loaded detents could be mounted in the axle receptacle.

Additional variations and equivalent constructions for retaining and adjusting axles 36, 38 will be apparent to one skilled in the art. For example, alternative fasteners, such as set screws, could replace lock pins 40, 40' or telescoping axles could be rigidly connected to base 12 and telescope by collapsing within themselves, with various stop positions being provided by suitable pins or detents. Of course, alternative materials can be employed, whether utility bag 10 utilizes an axle cylinder 30, a molded channel, or other type of axle receptacle.

Figure 6:
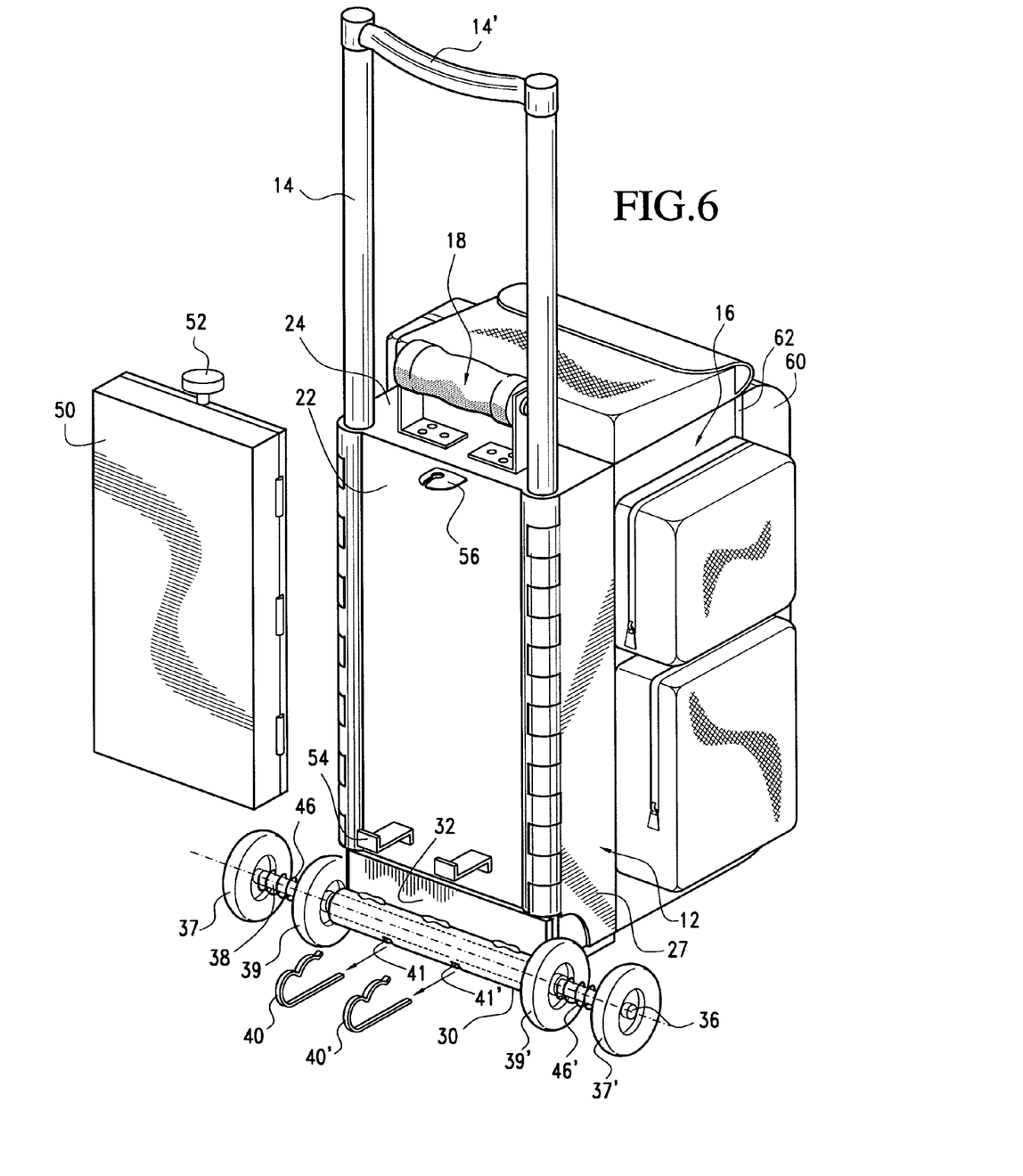
FIG. 6 is a perspective view of the utility bag of the present invention and showing the removable supply kit that is detached from the rigid base of the utility bag.

The rigid base 12 is suitable not only for securing a container such as flexible bag 16 on its front panel 23, but may carry other fixtures on its other panels, if desired. For example, as illustrated in FIG. 6, a rectilinear, removable supply kit 50, essentially shaped like rigid base 12, but smaller, may be secured to back panel 22 so that it "piggy backs" on the base of utility bag 10. Supply kit 50 is mounted so as to be removable from utility bag 10 for use in locations where utility bag 50 may not fit. It also offers additional cargo space when needed. A user has the option of removing supply kit 50 to reduce the overall weight of utility bag 10 when the kit is not needed.

In a preferred embodiment, kit 50 rests on a plurality of kit brackets 54 provided on back panel 22. The top of kit 50 snaps into a fixed, beveled retaining angle bracket 56 where it is held securely by a spring activated retention knob 52 on a wall of the kit. A user attaches supply kit 50 to back panel 22 by placing the end of the kit opposite knob 52 on kit brackets 54, and rotating the kit towards utility bag 10 while lifting the spring activated knob 52. The lifted knob 52 passes through a channel in retaining angle bracket 56, and is released once kit 50 is in place to secure the knob in an aperture in angle 56, since the knob is too wide to pass through the channel. Retaining angle bracket 56 and brackets 54 also serve as supports for utility bag 10 when the bag is laid in a horizontal position where rigid base 12 is essentially parallel to a support surface for utility bag 10.

In the preferred embodiment, kit brackets 54 are angled so that supply kit 50 is secured to utility bag 10 even when utility bag 10 is laid horizontally. One alternative to this embodiment eliminates the angles in brackets 54 in favor of apertures through brackets 54 that are engaged by pins built into supply kit 50. Other equivalent mounting options are available for providing a piggy-backed, removable supply kit.

Returning to FIG. 1, the container 16 is attached to front panel 23 of rigid base 12 by any suitable fasteners (not shown). The container preferably includes a number of compartments or exterior pockets that may be secured by zippers or loop and hook fasteners, may include a variety of attachments, and is designed to accept customizable inserts. It may be a flexible bag constructed of ballistic nylon or other durable fiber or plastic. The illustrated bag includes a lid 60 enclosing a main compartment 70; illustrated in FIG. 5. A zipper 62 extends around a portion of the periphery of lid 60 for selectively opening and closing the main compartment. When open, lid 60 provides a user complete access to the main compartment and a customized insert, if one is included. A pair of vertical zippers 63, 64 extend across the face of lid 60 to provide quick access to main compartment 70. A zipper handle 66, connected to zippers 63, 64, allows a user to simultaneously open the zippers.

An easy carry handle 68 is also provided for carrying utility bag 10 in a horizontal position. Handle 68 includes two straps 68a, 68b, each strap anchored to the sides of flexible bag 16. The straps can be connected over the face of lid by a duffel grip 69, which forms a single grip for a user and is fabricated from material capable of wrapping around straps 68a, 68b and connecting to itself. In practice, duffel grip 69 is fabricated from two-sided hook and loop fastener material and is attached to one strap, wraps around the second strap, and attaches to itself.

Utility bag 10 is illustrated in FIG. 1 in a vertical position, wherein base 12 is generally perpendicular to a support surface upon which utility bag 10 is placed. A plurality of support feet 17, located on flexible bag 16 adjacent to the bottom wall 25, balance the utility bag 10 in this upright or vertical position. Support feet 17 can be adhered, sewn, or otherwise attached to utility bag 10 so long as they are of sufficient length to balance utility bag 10 in the vertical position.

Figure 5:
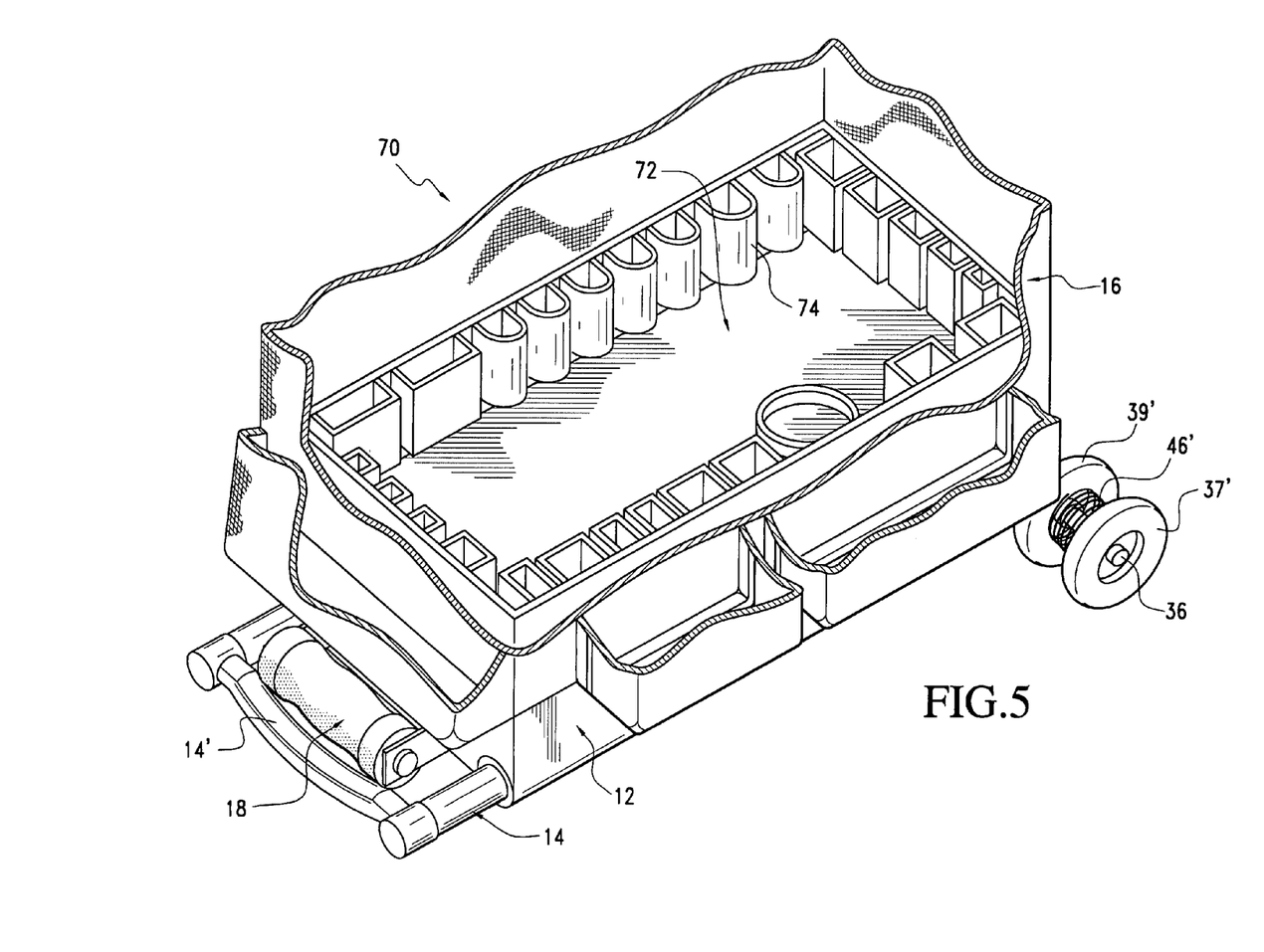
FIG. 5 is a partial cross-section view of the utility bag of the present invention with the bag situated in a horizontal position and illustrating one embodiment of an insert in the main compartment of the flexible bag.

Turning to FIG. 5, the main compartment 70 of bag 16 is illustrated as incorporating a customized insert 72 in the form of a rectilinear plastic tray with sidewalls. The tray includes an assortment of retainers 74 of various sizes and shapes included on the inside surfaces of the insert of the sidewalls, and an open space is provided for bulky tools or safety equipment.

The illustrated insert 72 is a preferred embodiment of a mechanic or repair person's insert. However, insert 72 could be customized for different uses, as retainers 74 are fabricated specifically for the intended use of the insert. As briefly noted above, a medical technician's insert, for example, would include receptacles that could sanitarily separate medical supplies and equipment. A hobbyist's insert would be constructed to accommodate the implements of a particular hobby, and so on. Other customized insert constructions are available.

In addition to transporting tools, utility bag 10 can also serve as a work "companion" or workbench. For this purpose, C-clamps (not pictured) or other clamping mechanisms can be attached to extendable handle 14 to support shelves, spools, documents, or other items that a worker, hobbyist, or other user may need. For a mechanic or repairperson, the shelves can be used to hold the tools necessary for a job. A flourescent light with a magnetic or adhesive backing could be attached for assisting the user in a poorly lit areas. In addition, a pair of hook and loop fasteners 67, 67' would be particularly useful for supporting an umbrella. An umbrella's handle would be inserted through both loops. The umbrella could then be expanded to protect a user during inclement weather. The versatile attachments, pockets, and connectors on the flexible bag creates a "work companion" aspect for the utility bag.

In summary, the wheeled utility bag of the present invention is a versatile and stable worker companion that incorporates new and customized components in order to improve upon the comfort, safety, and efficacy of presently known utility bags. An extendable axle provides stability for heavy loads and customized inserts allows users to adapt the bag for various activities. Although the present invention has been described in terms of a preferred embodiment, it will be understood that numerous variations and modifications may be made without departing from the invention. Thus, it is to be understood that within the scope of the appended claims, the invention may be practiced otherwise than as specifically described above.

What is claimed is:

1. A wheeled utility bag comprising:
   a rigid base, having first and second sides;
   an extendable handle extending from said rigid base;
   a container attached to said first side of said rigid base, said container including a main compartment;
   a supply kit removably attached to said second side of said rigid base; and
   first and second extendable axles attached to said rigid base, each of said first and said second extendable axles supporting a corresponding outboard rotatable wheel and a corresponding inboard rotatable wheel, each said outboard wheel being fixed to a distal end of its corresponding extendable axle, and each said inboard wheel being axially slidable along its corresponding extendable axle, said first and second extendable axles providing selectively wider and narrower stances for said utility bag.

2. The wheeled utility bag of claim 1, further comprising a fixed handle attached to said rigid base adjacent to said extendable handle.

3. The wheeled utility bag of claim 2, wherein said container incorporates a handle anchored to said container.

4. The wheeled utility bag of claim 1, wherein a customizable insert is secured within said main compartment, said main compartment shaped to receive said customizable insert, and said customizable insert comprising a tray with sidewalls, said customizable insert including retainers to secure items within said container.

5. The wheeled utility bag of claim 1, wherein said first and said second extendable axles each include a retracted channel and an extended channel at a proximal end of said axles.

6. The wheeled utility bag of claim 5 further including a fastener engaging one of said retracted and extended channels in each of said first or said second extendable axles.

7. The wheeled utility bag of claim 6 wherein each said fastener comprises a lock pin.

8. The wheeled utility bag of claim 1, wherein a spring is positioned on each of said first and said second extendable axles between corresponding outboard and inboard wheels, each said spring spacing apart corresponding outboard and inboard wheels when said first and said second extendable axles are in extended positions.

9. The wheeled utility bag of claim 1, further including a single axle receptacle attached to said rigid base, said single axle receptacle slidably receiving each of said first and said second extendable axles.

10. The wheeled utility bag of claim 1, wherein said extendable handle provides solid, non-telescoping arms for selectively inserting and extending said handles from said rigid base.

11. A multi-position axle assembly for a transportable platform comprising:
an axle receptacle;
an axle with a distal end and a proximal end;
a plurality of wheels supported by said distal end of said axle and said proximal end of said axle extending into said axle receptacle, said plurality of wheels comprises an outboard wheel and inboard wheel on said axle, said outboard wheel being fixed to a distal end of said axles and said inboard wheel being axially slidable along said axle;
a plurality of circumferential channels on said axle, said circumferential channels being located at said proximal end of said axle; and
a fastener in said axle receptacle for engaging one of said plurality of circumferential channels to secure said axle in said axle receptacle.

12. The multi-position axle assembly of claim 11 wherein said fastener comprises a lock pin.

13. The multi-position axle assembly of claim 11 wherein said axle receptacle comprises a channel in the transportable platform.

14. The multi-position axle assembly of claim 11 wherein said axle receptacle comprises an axle cylinder attached to the transportable platform, said axle cylinder retaining a plurality of said axles and incorporating a plurality of fasteners.

15. A method of adjusting a wheeled extendable axle for a utility bag comprising the steps of:
a) providing an axle in a axle receptacle on the utility bag;
b) fastening an extendable axle at a first position within said axle receptacle;
c) mounting a fixed, rotatable outboard wheel and a rotatable inboard wheel, on said extendable axle, said inboard wheel being axially slidable along said elongated axle;
d) releasing and sliding said extendable axle within said axle receptacle; and
e) refastening said extendable axle at a second location in said axle receptacle.

16. The method of claim 15, further including:
mounting a spring on said axle between said outboard wheel and said inboard wheel.

17. The method of claim 15 wherein fastening said axle includes locking said axle by a lock pin.

18. A wheeled utility bag comprising:
a rigid base, having first and second sides;
an extendable handle extending from said rigid base;
a fixed handle attached to said rigid base, said fixed handle located adjacent said extendable handle;
a container attached to said first side of said rigid base, said container including a main compartment;
a supply kit removably attached to said second side of said rigid base;
first and second extendable axles attached to said rigid base, each of said first and said second extendable axles supporting at least one rotatable wheel, said first and second extendable axles providing selectively wider and narrower stances for said utility bag; and
wherein said at least one rotatable wheel supported on each of said first and said second extendable axles comprises a corresponding outboard wheel and corresponding inboard wheel on each axle, each said outboard wheel being fixed to a distal end of its corresponding extendable axle, and each said inboard wheel being axially slidable along its corresponding extendable axles.

19. The wheeled utility bag of claim 18 further comprising a spring positioned on each of said first and said second extendable axles between corresponding outboard and inboard wheels, each said spring spacing apart corresponding outboard and inboard wheels when said first and said second extendable axles are in extended positions.

20. A wheeled utility bag comprising:
a rigid base, having first and second sides;
a handle extending from said rigid base;
a container attached to said first side of said rigid base;
an axle receptacle secured to said rigid base; and
at least one axle in said axle receptacle, said at least one axle supporting at least one rotatable wheel, said at least one axle providing a wide stance for said utility bag by supporting said at least one rotatable wheel outboard the width of said rigid base, wherein said at least one axle comprises first and second extendable axles; and
said at least one rotatable wheel supported on each of said first and said second extendable axles comprises a corresponding outboard wheel and corresponding inboard wheel on each axle, each said outboard wheel being fixed to a distal end of its corresponding extendable axle, and each said inboard wheel being axially slidable along its corresponding extendable axles.

21. The wheeled utility bag of claim 20 wherein a spring is positioned on each of said first and said second extendable axles between corresponding outboard and inboard wheels, each said spring spacing apart corresponding outboard and inboard wheels when said first and said second extendable axles are in extended positions.

22. The wheeled utility bag of claim 20 further comprising a fixed handle attached to said rigid base, said fixed handle located adjacent said handle extending from said rigid base.

* * * * *